United States Patent [19]

Dean

[11] Patent Number: 5,693,125
[45] Date of Patent: Dec. 2, 1997

[54] LIQUID-GAS SEPARATOR

[75] Inventor: W. Clark Dean, Simsbury, Conn.

[73] Assignee: United Technologies Corporation, Hartford, Conn.

[21] Appl. No.: 577,998

[22] Filed: Dec. 22, 1995

[51] Int. Cl.$^6$ ............................................. B01D 19/00
[52] U.S. Cl. ........................... 96/157; 55/218; 55/317; 55/318; 55/402; 55/409; 55/417; 96/174; 96/177; 96/210; 96/214
[58] Field of Search ..................... 55/210, 218, 317, 55/318, 402, 409, 417; 96/157, 174, 177, 187, 188, 207, 210, 213, 214, 215, 217

[56] References Cited

U.S. PATENT DOCUMENTS

| | | | |
|---|---|---|---|
| 1,766,666 | 6/1930 | Meyer | 55/218 |
| 1,993,944 | 3/1935 | Peebles | 96/174 |
| 2,380,097 | 7/1945 | Doerner | 183/25 |
| 2,634,907 | 4/1953 | Smith | 96/214 |
| 3,093,467 | 6/1963 | McLaughlin | 55/218 |
| 3,119,759 | 1/1964 | Hoover | 204/212 |
| 3,141,749 | 7/1964 | Hungate | 55/407 |
| 3,999,965 | 12/1976 | Burgess | 55/218 |
| 4,098,594 | 7/1978 | Shorr et al. | 55/403 |
| 4,268,281 | 5/1981 | Erickson . | |
| 4,361,490 | 11/1982 | Saget | 210/787 |
| 4,414,006 | 11/1983 | Armstrong | 96/174 |
| 4,506,655 | 3/1985 | Kuechler | 126/299 |
| 4,509,341 | 4/1985 | Zimmern | 62/512 |
| 4,911,738 | 3/1990 | Schneider . | |
| 5,244,479 | 9/1993 | Dean, II et al. | 96/174 |
| 5,409,523 | 4/1995 | Haeuser | 96/215 |

FOREIGN PATENT DOCUMENTS 89101810.3   8/1989   European Pat. Off. .

*Primary Examiner*—C. Scott Bushey
*Attorney, Agent, or Firm*—Malcolm J. Chisholm, Jr.

[57] ABSTRACT

An improved liquid/gas separator is disclosed for separating liquid and gas from a mixture that is mostly gas, within a zero gravity or variable gravity working environment. The separator includes a main housing that defines a pre-swirl chamber for receiving a liquid/gas mixture and an adjacent cylindrical separator chamber for containing liquid and gas separated from the mixture. A main shaft is rotationally secured along an interior longitudinal axis of the main housing and includes a hub portion defining exhaust slots in fluid communication with an exhaust duct within the hub for passing gas out of the separator chamber. A plurality of apertured coalescing disks are secured to the hub portion of the main shaft within the separator chamber for rotationally impacting liquid droplets and directing any droplets, bubbles or sheets of liquid formed on the disks away from the shaft toward and into a rotating liquid ring formed adjacent an interior circumference of the separator chamber. A level control system automatically maintains optimal separation of the liquid and gas by controlling a depth of the liquid ring and includes a level control valve in fluid communication with opposed inner and outer surfaces of the liquid ring so that the valve senses changes in a pressure differential between pressures adjacent the opposed surfaces of the liquid ring and variably discharges the liquid out of the liquid/gas separator in response to those sensed changes to control the depth of the liquid ring.

20 Claims, 5 Drawing Sheets

1

LIQUID-GAS SEPARATOR

TECHNICAL FIELD

The present invention relates to separators for separating a liquid from a gas in a liquid/gas mixture, and especially relates to a liquid/gas separator for separating a liquid from a mostly gas mixture in a zero gravity or variable gravity environment.

BACKGROUND OF THE INVENTION

Traditionally separation of a gas from a liquid has relied upon the effect of gravity to allow entrained liquid bubbles to arise up through and out of a liquid/gas mixture. However in a zero or variable gravity environment of space vehicles, complex liquid/gas separators have developed that compensate for the absence of the effect of gravity. Original zero gravity separators well known in the art used a motor-driven spinning drum to centrifugally separate heavier liquid droplets from the gas and to form a liquid ring about an interior circumference of the drum. A pitot tube within the drum removed the liquid to a storage tank, while the separated gas was drawn from an approximate centerline of the drum. Such original separators achieved acceptable levels of separation of non-soapy liquids, but suffered from "carryover" problems of some liquid remaining in the separated gas due to contact between the static pitot tube and the moving water, and some gas remaining in the liquid due to a wake effect of the pitot tube.

An improved "liquid/gas separator for soapy liquid" invention is disclosed in U.S. Pat. No. 5,244,479 to Dean, II et al., which patent is hereby incorporated herein by reference. That invention solves most of the problems associated with pitot tube rotary separators when applied to a mostly liquid mixture having a small component of the mixture being gas, such as discharge from a zero gravity toilet or hygiene apparatus etc. The "liquid/gas separator for soapy liquid" invention includes a cylindrical housing having a motor driven shaft along a longitudinal axis of a cylindrical chamber within the housing. A series of disks affixed to the shaft rotate to impart centrifugal motion to liquid droplets in the mixture thereby forming a liquid ring about an exterior circumference of the chamber, and friction between the rotating disks and the liquid ring imparts a rotational motion to the liquid ring. The gas portion of the mixture between the liquid ring and the shaft leaves the chamber through exhaust slots and an exhaust bore in the shaft. A regulating means variably discharges gas out of the separator to maintain the liquid ring at an optimum depth for a desired level of liquid/gas separation and a desired rate of liquid discharge out of the separator.

While the "liquid/gas separator for soapy liquid" is effective for mixtures having a relatively constant rate of liquid flow along with varying small amounts of gas, it is inefficient in separating relatively small amounts of liquid from mostly gas mixtures. For example, to remove condensate downstream of a condensing heat exchanger and slurper assembly in a space vehicle, a separator must receive and discharge a relatively constant flow of gas with varying small amounts of liquid. Because of inherent structural limitations of the regulating means that variably discharges the gas component of the mixture in the "liquid/gas separator for soapy liquid", that apparatus cannot efficiently discharge an adequate volume of gas in such a role at necessary low weight, volume and power requirements of space vehicles.

Accordingly it is the general object of the present invention to provide an improved liquid/gas separator that overcomes the limitations of the prior art.

It is a more specific object to provide a liquid/gas separator that separates a relatively small and varying amount of liquid from a relatively large amount of gas in a liquid/gas mixture.

It is another specific object to provide a liquid/gas separator that efficiently separates a relatively small and varying amount of liquid from a relatively large amount of gas in a liquid/gas mixture within low weight, volume and power consumption requirements typical of space craft.

It is yet another object to provide a liquid/gas separator that separates liquid and gas from a mostly gas mixture.

The above and other advantages of this invention will become more readily apparent when the following description is read with the accompanying drawings.

DISCLOSURE OF THE INVENTION

An improved liquid/gas separator is disclosed for separating liquid and gas from a mixture that is mostly gas, within a zero gravity or variable gravity working environment. In a preferred embodiment, the invention comprises a main housing that defines a pre-swirl chamber for receiving a liquid/gas mixture and an adjacent cylindrical separator chamber for containing liquid and gas separated from the mixture; a main shaft rotationally secured along an interior longitudinal axis of the main housing that includes a hub portion defining exhaust slots in fluid communication with an exhaust duct within the hub for passing gas out of the separator chamber; a plurality of apertured coalescing disks secured to the hub portion of the main shaft within the separator chamber for impacting liquid droplets and directing any droplets, bubbles or sheets of liquid formed on the disks away from the shaft toward and into a liquid ring formed adjacent an interior circumference of the separator chamber; a motor mechanically secured to the main shaft for rotating the shaft; a liquid discharge pump powered by the main shaft in fluid communication through discharge lines with the liquid ring for discharging the separated liquid to a liquid storage tank; a check valve for prohibiting flow out of the separator chamber during shutdown and start up of the liquid/gas separator; and, a level control system for controlling the depth of the liquid ring that includes a level control valve in fluid communication with an outer surface of the liquid ring adjacent the interior circumference of the separator chamber and an inner surface of the liquid ring opposed to the outer surface of the liquid ring, so that the valve senses a depth of the liquid in the liquid ring by measuring changing pressure differentials between a first inner pressure adjacent the inner surface and a second outer pressure adjacent the outer surface of the liquid ring and variably discharges the liquid from the separator chamber to maintain optimum separation of the liquid from the gas.

In operation of the liquid/gas separator of the present invention, a mixture of liquid and gas is directed into the preswirl chamber in a direction tangent to a circumference of the chamber thereby imparting rotational movement to the mixture within the preswirl chamber. The mixture then passes into the separator chamber to contact the spinning coalescing disks and pass through apertures in the disks, which apertures define a labyrinth passage between the disks through the separator chamber so that liquid droplets contact and spin off the disks thereby receiving a centrifugal force that moves the liquid droplets toward the exterior circumference of the separator chamber to form the liquid ring. When the depth of the liquid ring reaches a control depth (the "control depth" being a depth that is high enough for the liquid ring to contact peripheral edges of the coalescing disks), friction drag between the disks and liquid imparts a rotational motion to the liquid ring. Simultaneously, the gas portion of the mixture passes through the exhaust slots and exhaust duct of the hub portion of the shaft to leave the separator chamber. Any liquid droplets passing into the exhaust duct receive a further centrifugal force through contact with the spinning duct, and thereby move back out of the exhaust slots and into the liquid ring.

If the depth of the liquid ring increases beyond the control depth because of a sudden increase in a proportionate amount of liquid in the mixture, the surface area of the coalescing disks contacting the liquid rings increases, and therefore the rotational velocity and gravitational force of the liquid ring increase, effectively increasing the pressure of the liquid ring as measured by the liquid control valve. The level control valve senses the increase in the pressure differential between the liquid ring and the pressure of the mixture in the preswirl chamber and increases a rate of discharge of the liquid so that the depth of the liquid ring decreases, thereby decreasing the pressure of the liquid ring.

In a particular embodiment, the level control system includes a sensing differential maintenance means for maintaining a pressure differential between a pressure of the liquid ring adjacent a liquid discharge port and a pressure of liquid in a liquid sensing chamber of the level control valve, so that changes in pressure of the liquid adjacent the liquid discharge port caused by the liquid discharge pump do not directly control operation of the level control valve.

BEST MODE FOR CARRYING OUT THE INVENTION

Figure 1:
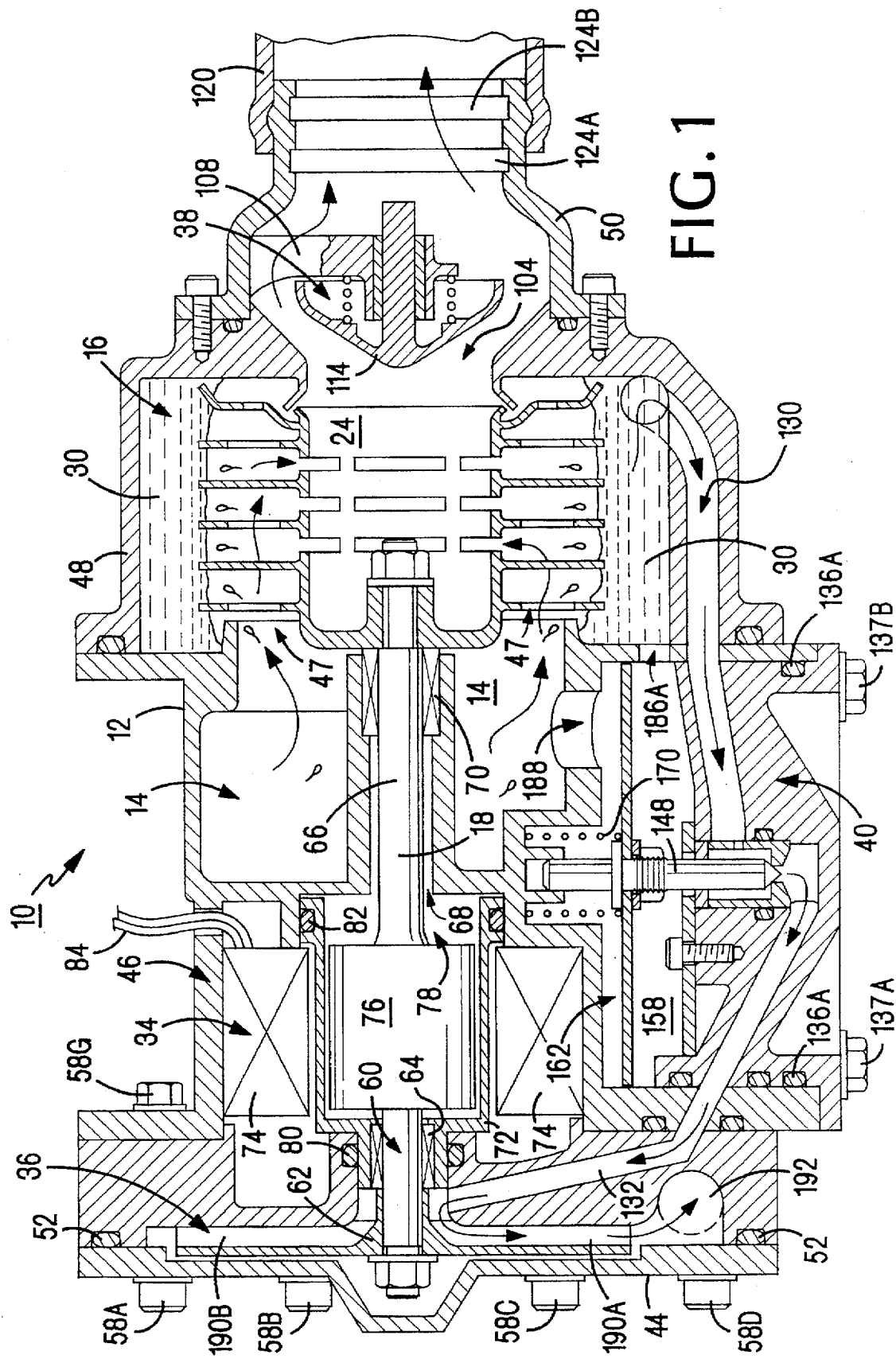
FIG. 1 is a cross-sectional view of an improved liquid/gas separator constructed in accordance with the present invention showing with directional arrows movement of a liquid/gas mixture through the separator.
Figure 2:
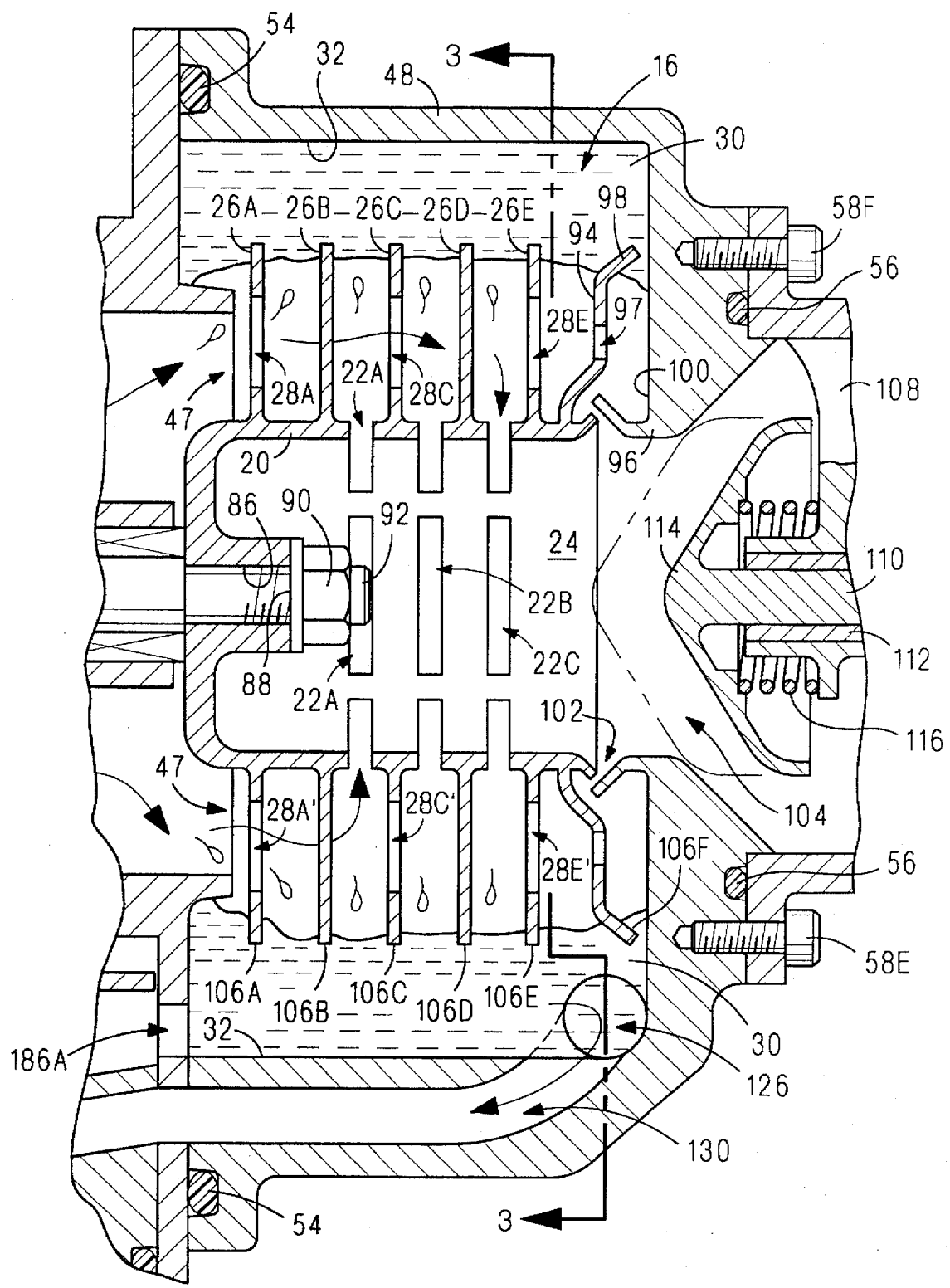
FIG. 2 is a fragmentary cross-sectional view of portion of the FIG. 1 liquid/gas separator.
Figure 3:
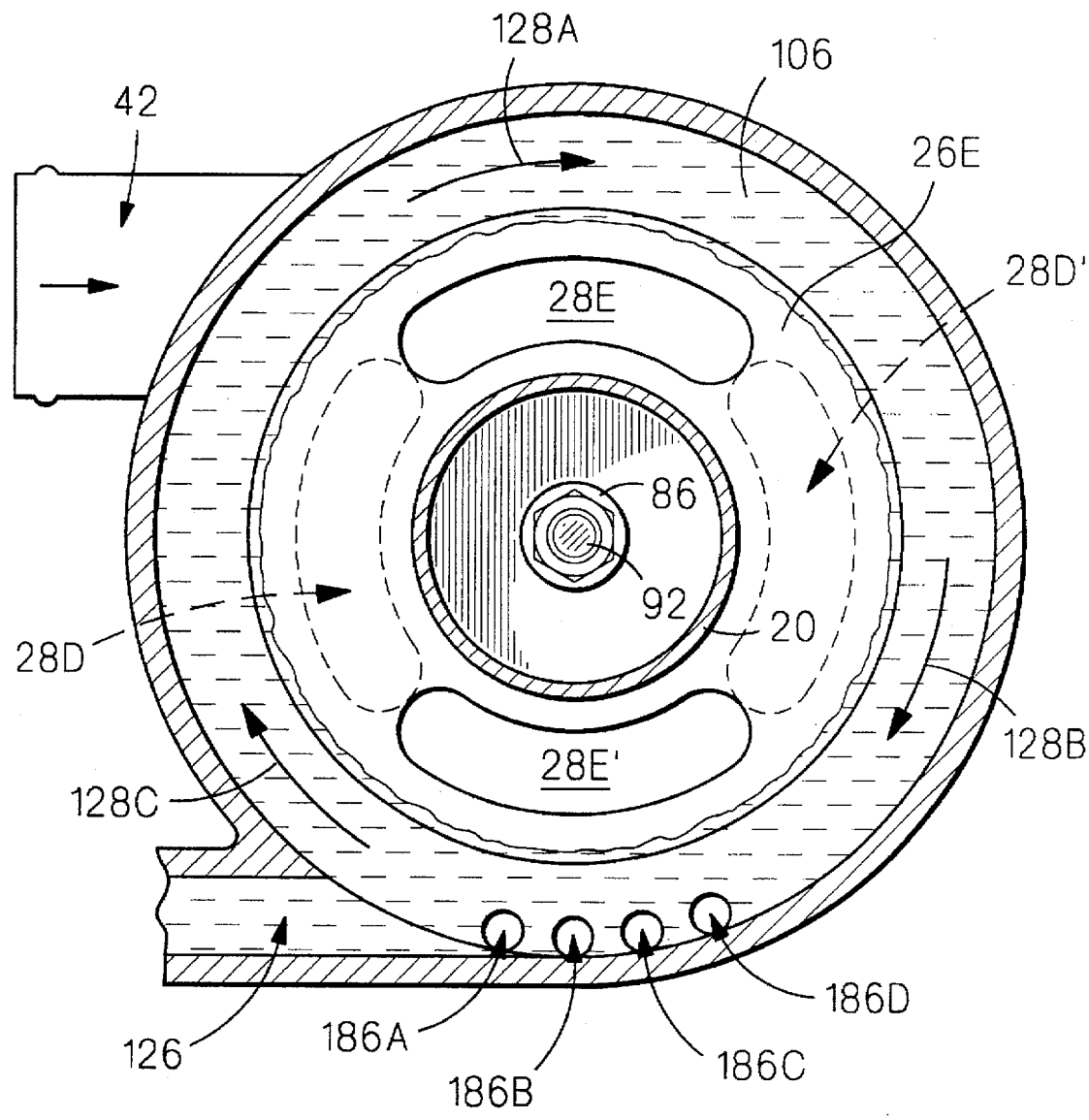
FIG. 3 is cross-sectional view of the FIG. 1 liquid/gas separator taken along sight line 3—3 of FIG. 2.
Figure 4:
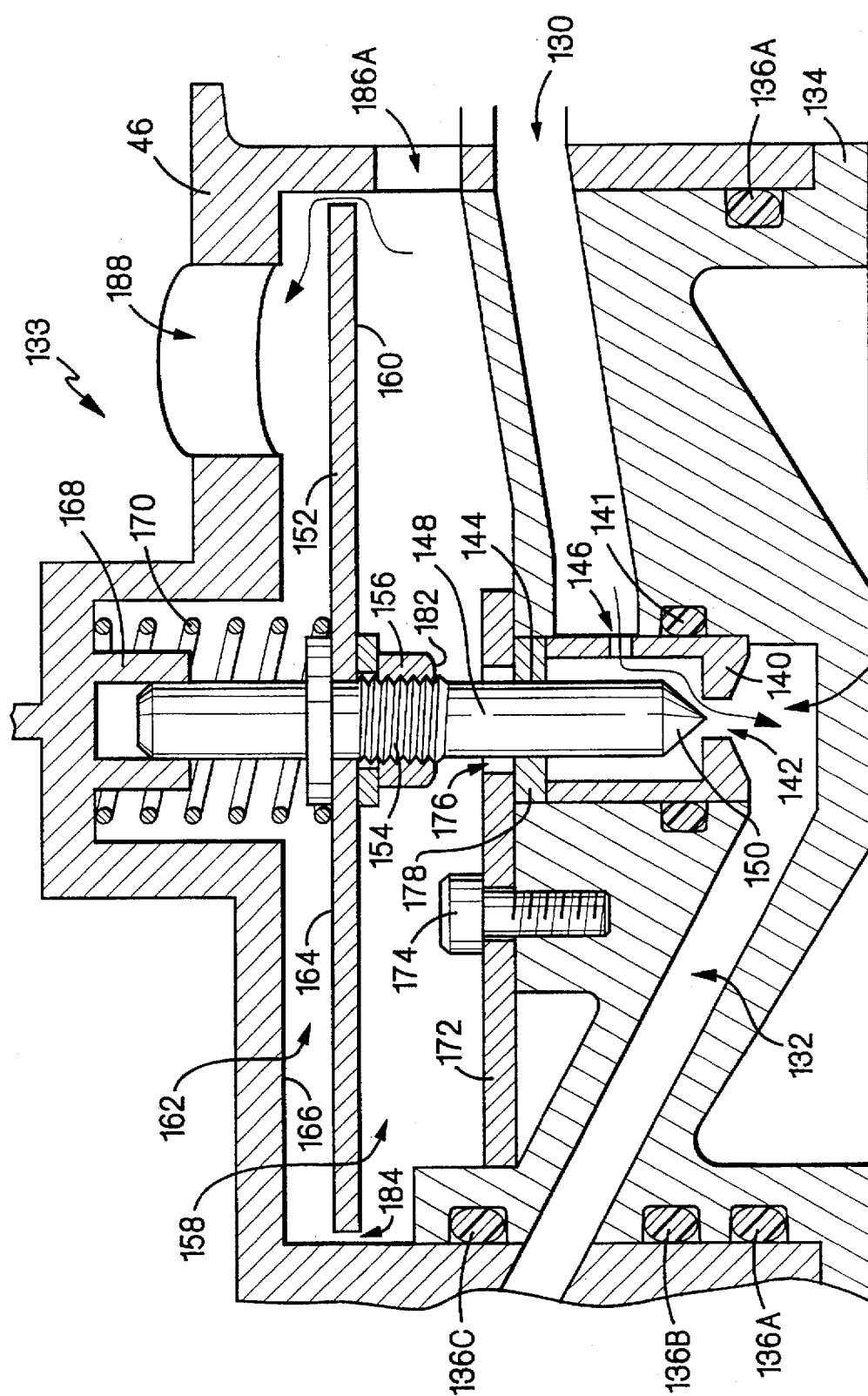
FIG. 4 is a fragmentary cross-sectional view of a level control valve of the FIG. 1 liquid/gas separator.

Referring to the drawings in detail, a preferred embodiment of the improved liquid/gas separator of the present invention is best shown in FIGS. 1, 2 and 4, and is generally designated by the reference numeral 10. The liquid/gas separator 10 basically comprises a main housing 12 that defines a pre-swirl chamber 14 for receiving a liquid/gas mixture and an adjacent cylindrical separator chamber 16 for containing liquid and gas separated from the mixture; a main shaft 18 rotationally secured along an interior longitudinal axis of the main housing 12 that includes a hub 20 portion defining exhaust slots 22A, 22B, 22C (seen best in FIG. 2) in fluid communication with an exhaust duct 24 within the hub 20 of the main shaft 18; a plurality of coalescing disks 26A, 26B, 26C, 26D, 26E secured to the hub 20 having apertures 28A, 28A', 28C, 28C', 28D, 28D' (28D being seen only in FIG. 3), and 28E, 28E'(as shown in FIG. 2) for rotationally impacting any liquid droplets in the separator chamber 16 and thereby directing the impacted droplets away from the main shaft 18 toward and into a liquid ring 30 adjacent an interior circumference 32 of the separator chamber 16; a motor means for rotating the shaft, such as a motor 34 mechanically secured to the main shaft 18; a liquid discharge means for discharging the separated liquid out of the liquid/gas separator, such as a liquid discharge pump, 36 mechanically secured to and powered by rotation of the main shaft 18 and in fluid communication with the liquid ring 30; a check valve 38 in fluid communication with the separator chamber 16 for preventing flow out of the separator chamber during shutdown and start up of the liquid/gas separator 10; and a level control system 40 for controlling the depth of the liquid ring 30.

As best seen in FIG. 3, the main housing 14 includes a mixture entry port 42 tangentially secured to the pre-swirl chamber 14 so that a liquid/gas mixture passing through the entry port 42 enters the pre-swirl chamber 14 at a tangent to an interior diameter of the roughly cylindrical chamber 14. As shown in FIG. 1, the main housing 12 also includes the following components: a liquid-side cap 44 mechanically secured to the liquid discharge pump 36; a pre-swirl enclosure 46 secured to the pump 36 that defines a separator entry port 47; a separator enclosure 48 adjacent separator entry port 47 of the pre-swirl enclosure 46; and a gas-side cap 50. A first fluid seal 52 is secured between the liquid-side cap 44 and liquid discharge pump 36. A second fluid seal 54 is secured between the pre-swirl enclosure 46 and the separator enclosure 48. And, a third seal 56 is secured between the separator enclosure 48 and the gas-side cap 50. The first, second and third fluid seals 52, 54, 56 may be common "O-ring" seals well known in the art, and provide fluid seals after the aforesaid main housing 12 are mechanically secured together by securing means such as standard threaded bolts and nuts, some of which are shown in FIG. 1 as bolts 58A, 58B, 58C, 58D, 58E, 58F, and 58G.

A pump end 60 of the main shaft 18 is secured within a pump throughbore 62 of the water pump 36 and supported therein by a first shaft bearing 64. A separator end 66 of the main shaft 18 is secured within a pre-swirl throughbore 68 defined within the pre-swirl enclosure 46, and is supported therein by a second shaft bearing 70. A motor housing 72 secures the first shaft bearing 64 and separates a stator 74 from a rotor 76 of the motor 34, and is sealed within motor cavity 78 of the pre-swirl enclosure 46 by fourth seal 80 and fifth seal 82. The motor 36 receives electrical power through a motor lead line 84 and may be either a standard AC or DC motor well known in the art.

The hub 20 portion of the main shaft 18 is positioned within the separator chamber 16 and includes a securing throughbore 86 having a support shoulder 88 that is secured to a stepped hub end 90 of the main shaft 18 by a standard mechanical means, such as hub bolt 92. As shown in FIG. 2, an "S" —shaped end coalescing disk 94 is positioned adjacent an exhaust end 96 of the hub 20, and includes a aperture 97 and a flanged end 98 to enhance centrifugal force applied to liquid impacting that end coalescing disk 94, and to impart further friction drag to the liquid ring 30 adjacent the end coalescing disk 94, thereby minimizing any risk of liquid moving by adhesion along an end wall 100 of the separation chamber 16 to enter the exhaust duct 24 of the hub 20 through an end exhaust slot 102 defined between the exhaust end of the hub 20 and exhaust throughbore 104 of the separation chamber 16.

The coalescing disks 26A–26E and end coalescing disk 94 extend away from a slot edge 106 of the hub 20 that defines the exhaust slots 22A–22C (as best seen in FIG. 2) and reach toward the interior circumference 32 of the separator chamber 16 so that peripheral edges 106A, 106B.

106C, 106D, 106E, 106F of the coalescing disks 26A–26E and 94 contact the liquid ring 30 when the liquid ring is a "control depth", as shown in FIGS. 1 and 2. The "control depth" is defined for the purposes of explaining the liquid/gas separator 10 of the present invention as the depth of the liquid ring 30 when it is in contact with the peripheral edges 106A, 106B, 106C, 106D, 106E, 106F of the coalescing disks.

Figure 5:
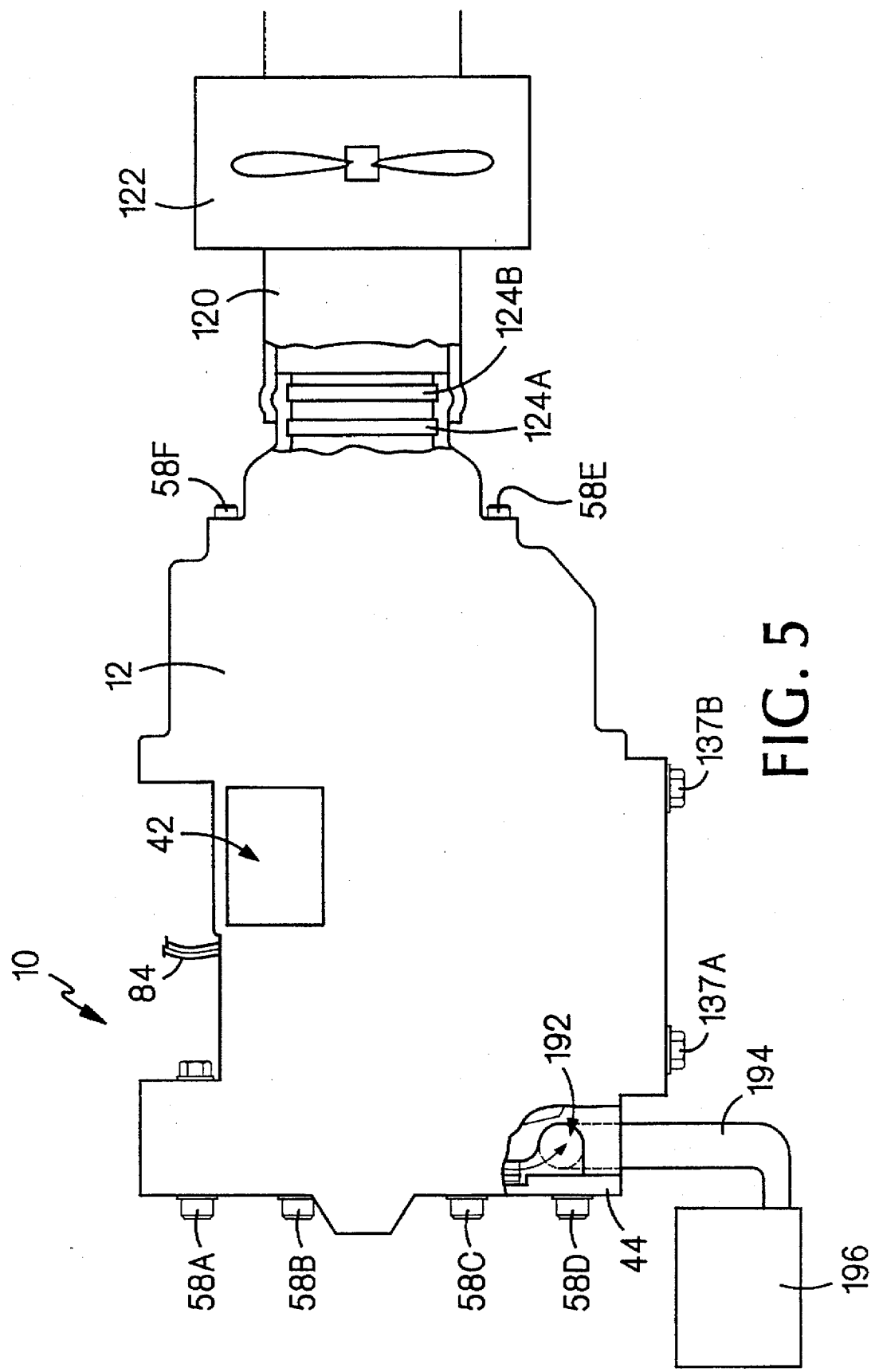
FIG. 5 is a flat plan view showing the FIG. 1 liquid/gas separator with related components in a schematic presentation.

The check valve 38 is secured by a valve support 108 within the gas-side cap 50 and includes a poppet guide 110 adjustably moved by a pressure differential established by a fan 122 in fluid communication with the check valve 38 and supported by a poppet guide bushing 112 within the valve support 108. A sealing poppet 114 is secured to the poppet guide 110, and is adapted to move by the poppet guide 110 into the exhaust throughbore 104 to seal the throughbore by sealing contact with the exhaust end 96 of the separator enclosure 48. The poppet guide 110 moves the sealing poppet 114 into the exhaust throughbore 104 in response to a coil spring 116, and moves the sealing seat out of contact with the exhaust throughbore 104 in response to the fan 122 induced pressure differential. The check valve 38 is in fluid communication with a fan duct 120 that in turn is in fluid communication with the fan 122 (shown schematically in FIG. 5), which fans are well known in the art.

Liquid sensors 124A, 124B well known in the art which measure electrical conductivity of liquid adjacent a wall of the fan duct 120 are positioned within the stream of separated gas leaving the exhaust throughbore 104 so that, upon sensing of liquid within the gas, the fan 122 can be shut down as a result of communication to the fan from the sensors 124A, 124B.

As shown in FIGS. 1 and 2, a liquid discharge port 126 is positioned within the separator enclosure 48 adjacent the interior circumference 32 of the separator chamber 16. The liquid discharge port 126 is tangential to a rotational flow of the liquid ring, which rotational flow is designated by directional arrows 128A, 128B, 128C in FIG. 3. A first liquid discharge line 130 is in fluid communication with the discharge port 126 and directs liquid from the separator chamber 16 into the level control system 40. A second liquid discharge line 132 is in fluid communication with the level control system 40, and directs liquid from the level control system 40 into the liquid discharge pump 36.

The level control system 40 includes a level control means, such as a level control valve 133 (best seen in FIG. 4), for variably discharging liquid out of the separator chamber 16 to automatically maintain optimum separation of the liquid and gas by controlling a depth of the liquid ring 30. (The "depth" of the liquid ring 30 being defined for purposes herein as the shortest distance from an outer surface of the liquid ring 30 adjacent the interior circumference 32 of the separator chamber 16 to an inner surface of the liquid ring 30 that is contacted by the peripheral edges 106A–106F of the coalescing disks 26A–26E.) he level control valve 133 includes a control valve housing 134 that defines portions of the first and second liquid discharge lines 130, 132, and is secured by standard valve housing seals 136A, 136B and standard mechanical fasteners such as valve bolts 137A, 137B (seen only in FIG. 1) within the pre-swirl enclosure 46; a valve seat cavity 138 in fluid communication with both the first and second liquid discharge lines 130, 132; a cylindrical valve seat 140 sealed within the cavity 138 by a standard valve seat seal 141 that defines a liquid discharge throughbore 142 and a valve stem throughbore 144 at opposed ends of the cylindrical valve seat 140 and also defines a liquid discharge inlet 146 within a wall of the valve seat 140 in fluid communication with the first liquid discharge line 130 and the liquid discharge throughbore 142; a valve stem 148 that passes through the valve stem throughbore 144 and has a conical control tip 150 that adjustably projects into the liquid discharge throughbore 142 of the valve seat to control a rate of discharge of liquid from the first liquid discharge line 130 to the second liquid discharge line 132; a sensing piston 152 secured to a threaded segment 154 of the valve stem 148 by a standard threaded securing coupler 156 secured to the piston; a liquid sensing chamber 158 defined between the control valve housing 134 and a bottom surface 160 of the sensing piston 152; a liquid/gas mixture sensing chamber 162 defined between a top surface 164 of the sensing piston 152 and a sensing chamber wall 166 of the pre-swirl enclosure 46; a valve stem mount collar 168 defined within the sensing chamber wall 166 that adjustably receives and secures the valve stem 148; and a stem control spring 170 positioned around the collar 168 and between the sensing chamber wall 166 and the sensing piston 152 that adjustably biases the conical control tip 150 of the valve stem 148 to variably discharge liquid into the second liquid discharge line 132 as the sensing piston 152 moves in response to changing pressure differentials between the liquid and mixture sensing chambers 158, 162.

A preferred embodiment of the level control valve 133 also includes an isolating means for isolating the liquid sensing chamber 158 from pressure in an area adjacent the liquid discharge throughbore 142, which isolating means includes a stem throughbore retention plate 172 secured to the control valve housing 134 by retention bolt 174, which plate includes a retention throughbore 176 through which the valve stem 148 passes adjacent a valve seat seal collar 178 that is secured over the valve stem throughbore 144 of the valve seat by the stem throughbore retention plate 172. An additional feature of preferred embodiments of the level control valve 133 is a purge gap 184 defined between the sensing piston 152 and the sensing chamber wall 166 of the pre-swirl enclosure 146 that permits a small flow of liquid in the liquid sensing chamber 158 to enter the mixture sensing chamber 162 to enable a regular but small flow of the liquid out of the liquid sensing chamber 158 and thereby prevent the liquid in that chamber 158 from becoming a stagnant bio-hazard.

The level control system 40 also includes at least one liquid sensing port 186A, 186B, 186C, 186D (186A being shown in FIGS. 1 and 4, and 186A–186D being shown in FIG. 3) defined in the pre-swirl enclosure 46 between the liquid sensing chamber 158 and the interior circumference 32 of the of the separator chamber 16 so that the liquid sensing chamber 158 is in fluid communication through the liquid sensing ports 186A–186D with an outer surface of the liquid ring 30 adjacent the interior circumference 32 of the separator chamber 16. The level control system 40 also includes at least one mixture sensing port 188 defined in the pre-swirl enclosure 46 between the mixture sensing chamber 162 of the level control valve 133 and the pre-swirl chamber 12 of the main housing 12 so that the liquid/gas mixing chamber 162 is in fluid communication through the mixture sensing port 188, pre-swirl chamber 14 and separator entry port 47 with an inner surface of the liquid ring 30 opposed to the outer surface of the liquid ring. Therefore, as can be readily seen in FIGS. 1 and 3, the mixture sensing chamber 162 receives a portion of the liquid/gas mixture as it enters the pre-swirl chamber 14 while the liquid sensing chamber 158 receives liquid from the liquid ring 30 adjacent the interior circumference 32 of the separator chamber 16 so that the sensing piston 152 moves in response to changing pressure differentials between a first inner pressure adjacent the inner surface of the liquid ring 30 and a second outer pressure adjacent the outer surface of the liquid ring 30.

As best seen in FIG. 4, the valve stem throughbore 144 is dimensioned so that a stem slide gap (not shown) between the valve seat seal collar 178, stem throughbore retention plate 172 and the valve stem 148 has a flow surface area through which fluid may flow between the liquid discharge inlet 146 and the liquid sensing chamber 158, which slide gap flow surface area is less than one tenth flow surface areas of either the at least one liquid sensing ports 186A–186D, the purge gap 184, or the mixture sensing port 188, so that any leakage between the liquid discharge inlet 146 through the stem slide gap into the liquid sensing chamber 158 will not appreciably effect a pressure differential between the liquid sensing chamber 158 and liquid/gas mixture sensing chamber 162. Similarly, the purge gap 184 defines a flow surface area that is less than one tenth a flow surface area of either the at least one liquid sensing ports 186A–186D, or the mixture sensing port 188, so that a pressure differential between the liquid sensing chamber 158 and the liquid/gas mixture chamber 162 results from flow through the liquid sensing ports 186A–186D and the mixture sensing port 188 and not from flow through the purge gap 184.

As will be apparent to one skilled in valve art, the stem control spring 170 is selected to exert a specific force that will keep the valve stem in a specific position in response to a specific pressure differential between the liquid and sensing chambers 158, 162. For example, the stem control spring 170 in ordinary operation will exert sufficient force so that the conical control tip 150 of the valve stem remains in sealing contact with the valve seat 140 adjacent its liquid discharge throughbore 142 until the liquid ring reaches the above defined control depth (wherein the peripheral edges 106A–106F of the coalescing disks contact the liquid ring 30).

Such a configuration will serve to demonstrate the ordinary operation of the improved liquid/gas separator 10 of the present invention. During shut down, the fan 122 is operating; the motor 34 is not turning the coalescing disks 26A–26E; and, the sealing seat of the check valve 38 is sealing the exhaust throughbore 104 of the separator so that neither liquid nor gas can leave the separator 10. Upon activation of the motor 34 in a zero or variable gravity environment, the coalescing disks 26A–26E start spinning and contact any liquid droplets that may be in the separator chamber 16. After a pre-determined period of time, the fan 122 may be started. Once flow is established into the pre-swirl chamber 14, the mixture travels a serpentine path through the apertures 28A–28E' of the disks. The contact of the droplets by the disks causes them to either move directly toward the interior circumference 32 of the separator chamber 16, or to coalesce and sheet on the disks until enough liquid has formed on the disk for it to be thrown off the disks to the interior circumference of the separator chamber 16. Eventually the water ring 30 is formed and grows in depth until it reaches the control depth (shown in FIGS. 1 and 2) at which time the contact between the peripheral edges 106A–106F of the disks imparts an enhanced rotational velocity to the liquid ring 30. The enhanced velocity is equivalent to an increase in a gravitational force of the liquid ring, which is transmitted through the liquid sensing ports 186A–186D as an increase in pressure of the liquid in the liquid sensing chamber 158 thereby causing the sensing piston 152 to move the valve stem 148 out of sealing contact with the valve seat 140 so that liquid may move from the first liquid discharge line 130, through the level control valve 133 to the second liquid discharge line 132, and into the liquid discharge pump 36 where it is impacted by the pump's impellers 190A, 190B (shown in FIG. 1) and moved out of the separator 10 through a separator discharge port 192 into a liquid transfer line 194 to be moved to a liquid storage tank 196 (shown schematically in FIG. 5). For application of the liquid/gas separator 10 involving pumping into a storage container at less than 1 p.s.i. above a gas pressure within the separator chamber 16, the liquid discharge pump 36 is not required because a pressure at the liquid discharge port 126 is generally 1 p.s.i above the gas pressure within the separator chamber 16.

If the liquid sensors 124A, 124B sense liquid leaving the throughbore 104, the fan 122 is stopped. As is apparent, the level control system 40 automatically regulates the depth of the liquid ring 30 to compensate for varying proportions of liquid and gas in the mixture entering the separator 10. If the mixture includes an increase in the proportion of liquid, the depth of the liquid ring 30 increases, and the resulting increased contact between the coalescing disks 26A–26E and liquid ring 30 increases the rotational velocity of the liquid ring, thereby increasing the pressure in the liquid sensing chamber 158. That causes the conical control tip 150 of the valve stem 148 to move further away from the liquid discharge throughbore 142, which causes the rate of discharge of liquid out of the separator chamber 16 to increase, thereby decreasing the depth of the liquid ring 30 and the resulting pressure in the liquid sensing chamber 158. That in turn slows the rate of liquid discharge until the control depth is again reached.

When the liquid discharge pump 36 starts pumping after the control depth of the liquid ring 30 has been reached, the liquid being discharged from the separator chamber 16 may receive an increased flow rate out of the separator 10 as a result of the action of the discharge pump 36. Such an enhanced movement of the liquid through the first and second discharge lines would cause an effective and immediate pressure drop in the liquid ring 30 and within the liquid sensing chamber 158, thereby causing a sudden movement of the conical control tip 150 of the valve stem 148 toward the liquid discharge throughbore 142 to immediately stop or slow down the rate of liquid discharge out of the separator chamber 16. When the liquid/gas separator 10 changes from a start-up mode to a constantly running mode, such a circumstance forces the liquid control system 40 to respond primarily to changes from a stagnation pressure to a dynamic pressure of the liquid in the separation chamber 16 as the liquid first does not flow through the first and second liquid discharge lines 130, 132 and next commences to flow through the lines 130, 132 and is pumped out of the separator 10.

To compensate for such a circumstance, a preferred embodiment of the liquid/gas separator 10 includes a sensing differential maintenance means for maintaining a pressure differential between the pressure of the liquid ring 30 adjacent the liquid discharge port 126 and the pressure of the liquid within the sensing chamber 158. The sensing differential maintenance means includes the liquid discharge port 126 being positioned tangentially to the rotational flow of the liquid ring and the at least one liquid sensing port 186A–186D being positioned perpendicular to the rotational flow of the liquid ring, as seen in FIGS. 1 and 2. By the phrase "positioned tangentially to the rotational flow of the liquid ring", it is meant that the liquid discharge port 126 is positioned so that the rotational force acting on the liquid in the liquid ring 30 forces the liquid in a direction approximately parallel to a flow direction axis of flow of liquid through the liquid discharge port 126. By the phrase "being positioned perpendicular to the rotational flow of the liquid ring", it is meant that the at least one liquid sensing port 186A–186D is positioned so that the rotational force acting on the liquid in the liquid ring 30 forces the liquid in a direction approximately perpendicular to a flow direction axis of flow of liquid through the at least one liquid sensing port 186A–186D.

Because the liquid discharge port 126 from the separator chamber 16 is positioned tangentially to the rotational flow of the liquid ring 30, the momentum of the rotating liquid into the first liquid discharge line 130 results in a higher stagnation pressure of that liquid than the stagnation pressure of the liquid in the liquid sensing chamber 158. Consequently, a sudden reduction in the pressure of the liquid in the first and second liquid discharge lines 130, 132 resulting from variations in liquid flow rate through the first and second liquid discharge lines 130, 132 does not directly reduce the pressure of the liquid in the liquid sensing chamber 158. Therefore, the level control system 40 is variably discharging liquid from the separator 10 based on the depth of liquid in the liquid ring 30, rather than on pressure changes of liquid moving through the level control system 40. That structural juxtaposition of the liquid discharge port 126 of the separator chamber 16 and the liquid sensing port 186A–186D results in maintenance of a pressure differential between the liquid leaving the separator chamber 16 and the liquid in the liquid sensing chamber 158. The liquid/gas separator 10 of the present invention is constructed of ordinary materials well known in the art such as stainless steel, aluminum, various alloys and improved plastics.

While the liquid/gas separator 10 of the present invention has been described and illustrated with respect to a particular construction and within a particular working environment, it will be understood by those skilled in the art that the present invention is not limited to this particular example. For example, the rotational force for spinning the main shaft 18 may be applied by a motor means mechanically separated from the main housing 12 of the separator, and/or the liquid discharge pump 36 may likewise be separated from the main housing. Accordingly, reference should be made primarily to the attached claims rather than the foregoing specification to determine the scope of the invention.

I claim:

1. An improved liquid/gas separator for separating liquid and gas from a liquid/gas mixture having varying proportions of liquid and gas in a zero or variable gravity environment, which comprises:

a. a main housing that defines a pre-swirl chamber for receiving the liquid/gas mixture and an adjacent cylindrical separator chamber in fluid communication with the pre-swirl chamber for containing liquid and gas separated from the mixture;

b. a main shaft rotationally secured along an interior longitudinal axis of the main housing having a hub portion within the separator chamber defining a plurality of exhaust slots in fluid communication with an exhaust duct within the hub so that gas within the separator chamber may flow through the exhaust slots into and through the exhaust hub and out of the liquid/gas separator;

c. a plurality of coalescing disks secured to the hub portion having at least one aperture defined within each disk for rotationally impacting any liquid droplets in the mixture passing from the pre-swirl chamber into the separator chamber and through the apertures so that the impacted droplets move away from the main shaft to form a rotating liquid ring adjacent an interior circumference of the separator chamber;

d. motor means for rotating the main shaft; and e. level control means in fluid communication with both the mixture in the pre-swirl chamber and the liquid in the liquid ring for variably discharging liquid out of the separator chamber to automatically maintain optimum separation of the liquid and gas by controlling a depth of the liquid ring.

2. The improved liquid/gas separator of claim 1, wherein the level control means comprises a level control valve including a control valve housing that defines a first liquid discharge line in fluid communication with a discharge port in the separator chamber adjacent its interior circumference, a valve seat cavity in fluid communication with the first liquid discharge line, and a second liquid discharge line in fluid communication with the valve seat cavity and a separator discharge port; a valve seat within the valve seat cavity that defines a liquid discharge throughbore and a valve stem throughbore at opposed ends of the valve seat and the valve seat also defines a liquid discharge inlet within a wall of the valve seat in fluid communication with the first liquid discharge line and the liquid discharge throughbore; a valve stem that passes through the valve stem throughbore having a control tip that adjustably projects into the liquid discharge throughbore of the valve seat to control a rate of discharge of liquid from the first liquid discharge line through the liquid discharge throughbore and into the second liquid discharge line; a sensing piston secured to the valve stem; a liquid sensing chamber defined between the control valve housing and a bottom surface of the sensing piston in fluid communication with an outer surface of the liquid ring adjacent the interior circumference of the separator chamber; a liquid/gas mixture sensing chamber defined between a top surface of the sensing piston and a sensing chamber wall of the main housing in fluid communication with an inner surface of the liquid ring opposed to the outer surface of the liquid ring; a valve stem mount collar defined within the sensing chamber wall that adjustably receives and secures the valve stem; and a stem control spring positioned around the valve stem mount collar and between the sensing chamber wall and the sensing piston that adjustably biases the control tip of the valve stem to variably discharge liquid into the second liquid discharge line as the sensing piston moves in response to changing pressure differentials between a first inner pressure adjacent the inner surface of the liquid ring and a second outer pressure adjacent the outer surface of the liquid ring, so that whenever the proportion of liquid in the liquid/gas mixture entering the pre-swirl chamber increases, the depth of liquid in the rotating liquid ring increases beyond a control depth, wherein peripheral edges of the coalescing disks contact the liquid ring, and the second outer pressure increases causing the level control valve to sense a change in the pressure differential and in response increase a rate of discharge of liquid through the second liquid discharge line and out of the liquid/gas separator through the separator discharge port until the depth of the liquid ring and the corresponding second outer pressure decrease to that of the control depth and in response the level control valve decreases the rate of discharge of liquid out of the liquid/gas separator.

3. The improved liquid/gas separator of claim 1 further comprising a check valve secured in fluid communication with the exhaust duct of the hub portion of the main shaft to adjustably prohibit flow of liquid or gas out of the separator chamber through the exhaust duct.

4. The improved liquid/gas separator of claim 3, further comprising a liquid discharge pump secured in fluid communication with the level control means to pump liquid out of the liquid/gas separator.

5. The improved liquid/gas separator of claim 4, further comprising a fan secured in fluid communication with the exhaust duct to draw gas through the pre-swirl chamber, separator chamber and exhaust duct.

6. The improved liquid/gas separator of claim 5, further comprising at least one liquid sensor in fluid communication with the exhaust duct and in electrical communication with the fan to shut down the fan upon sensing of liquid passing from the separator chamber through the exhaust duct.

7. An improved liquid/gas separator for separating liquid and gas from a liquid/gas mixture having varying proportions of liquid and gas in a zero or variable gravity environment, which comprises:
   a. a main housing that defines a pre-swirl chamber for receiving the liquid/gas mixture and an adjacent cylindrical separator chamber in fluid communication with the pre-swirl chamber for containing liquid and gas separated from the mixture;
   b. a main shaft rotationally secured along an interior longitudinal axis of the main housing having a hub portion within the separator chamber defining a plurality of exhaust slots in fluid communication with an exhaust duct within the hub so that gas within the separator chamber may flow through the exhaust slots into and through the exhaust hub and out of the liquid/gas separator;
   c. a plurality of coalescing disks secured to the hub portion having at least one aperture defined within each disk for rotationally impacting any liquid droplets in the mixture passing from the pre-swirl chamber into the separator chamber and through the apertures so that the impacted droplets move away from the main shaft to form a rotating liquid ring adjacent an interior circumference of the separator chamber;
   d. motor means for rotating the main shaft;
   e. level control means in fluid communication through a mixture sensing port with the mixture in the pre-swirl chamber and in fluid communication through at least one liquid sensing port with the liquid in the liquid ring for variably discharging liquid out of the separator chamber to automatically maintain optimum separation of the liquid and gas by controlling a depth of the liquid ring; and,
   f. a sensing differential maintenance means for maintaining a pressure differential between a pressure of liquid in the rotating liquid ring and a pressure of liquid in a sensing chamber of the level control means.

8. The improved liquid/gas separator of claim 7, wherein the level control means comprises a level control valve including a control valve housing that defines a first liquid discharge line in fluid communication with a discharge port in the separator chamber adjacent its interior circumference, a valve seat cavity in fluid communication with the first liquid discharge line, and a second liquid discharge line in fluid communication with the valve seat cavity and a separator discharge port; a valve seat within the valve seat cavity that defines a liquid discharge throughbore and a valve stem throughbore at opposed ends of the valve seat and the valve seat also defines a liquid discharge inlet within a wall of the valve seat in fluid communication with the first liquid discharge line and the liquid discharge throughbore; a valve stem that passes through the valve stem throughbore having a control tip that adjustably projects into the liquid discharge throughbore of the valve seat to control a rate of discharge of liquid from the first liquid discharge line through the liquid discharge throughbore and into the second liquid discharge line; a sensing piston secured to the valve stem; a liquid sensing chamber defined between the control valve housing and a bottom surface of the sensing piston in fluid communication through the at least one liquid sensing port with an outer surface of the liquid ring adjacent the interior circumference of the separator chamber; a liquid/gas mixture sensing chamber defined between a top surface of the sensing piston and a sensing chamber wall of the main housing in fluid communication through the mixture sensing port with an inner surface of the liquid ring opposed to the outer surface of the liquid ring; a valve stem mount collar defined within the sensing chamber wall that adjustably receives and secures the valve stem; and a stem control spring positioned around the valve stem mount collar and between the sensing chamber wall and the sensing piston that adjustably biases the control tip of the valve stem to variably discharge liquid into the second liquid discharge line as the sensing piston moves in response to changing pressure differentials between a first inner pressure adjacent the inner surface of the liquid ring and a second outer pressure adjacent the outer surface of the liquid ring.

9. The improved liquid/gas separator of claim 8, wherein the sensing differential maintenance means comprises the liquid discharge port being positioned tangentially to the rotational flow of the liquid ring so that a rotational force acting on the liquid in the liquid ring forces the liquid in a direction approximately parallel to a flow direction axis of flow of liquid through the liquid discharge port, and the at least one liquid sensing port being positioned perpendicular to the rotational flow of the liquid ring so that the rotational force acting on the liquid in the liquid ring forces the liquid in a direction approximately perpendicular to a flow direction axis of flow of liquid through the at least one liquid sensing port into the liquid sensing chamber of the level control valve.

10. The improved liquid/gas separator of claim 9, further comprising a check valve secured in fluid communication with the exhaust duct of the hub portion of the main shaft to adjustably prohibit flow of liquid or gas out of the separator chamber through the exhaust duct.

11. The improved liquid/gas separator of claim 10, further comprising a liquid discharge pump secured to the main shaft and in fluid communication with the level control valve to pump liquid out of the liquid/gas separator.

12. The improved liquid/gas separator of claim 11, further comprising a fan secured in fluid communication with the exhaust duct to draw gas through the pre-swirl chamber, separator chamber and exhaust duct.

13. The improved liquid/gas separator of claim 12, further comprising at least one liquid sensor in fluid communication with the exhaust duct and in electrical communication with the fan to shut down the fan upon sensing of liquid passing from the separator chamber through the exhaust duct.

14. An improved liquid/gas separator for separating liquid and gas from a liquid/gas mixture having varying proportions of liquid and gas in a zero or variable gravity environment, which comprises:
   a. a main housing that defines a pre-swirl chamber for receiving the liquid/gas mixture and an adjacent cylindrical separator chamber in fluid communication with the pre-swirl chamber for containing liquid and gas separated from the mixture;

b. a main shaft rotationally secured along an interior longitudinal axis of the main housing having a hub portion within the separator chamber defining a plurality of exhaust slots in fluid communication with an exhaust duct within the hub so that gas within the separator chamber may flow through the exhaust slots into and through the exhaust hub and out of the liquid/gas separator;

c. a plurality of coalescing disks secured to the hub portion having at least one aperture defined within each disk for rotationally impacting any liquid droplets in the mixture passing from the pre-swirl chamber into the separator chamber and through the apertures so that the impacted droplets move away from the main shaft to form a rotating liquid ring adjacent an interior circumference of the separator chamber;

d. motor means for rotating the main shaft;

e. a level control valve including a control valve housing that defines a first liquid discharge line in fluid communication with a discharge port in the separator chamber adjacent its interior circumference, a valve seat cavity in fluid communication with the first liquid discharge line, and a second liquid discharge line in fluid communication with the valve seat cavity and a separator discharge port; a valve seat within the valve seat cavity that defines a liquid discharge throughbore and a valve stem throughbore at opposed ends of the valve seat and the valve seat also defines a liquid discharge inlet within a wall of the valve seat in fluid communication with the first liquid discharge line and the liquid discharge throughbore; a valve stem that passes through the valve stem throughbore having a control tip that adjustably projects into the liquid discharge throughbore of the valve seat to control a rate of discharge of liquid from the first liquid discharge line through the liquid discharge throughbore and into the second liquid discharge line; a sensing piston secured to the valve stem; a liquid sensing chamber defined between the control valve housing and a bottom surface of the sensing piston in fluid communication through at least one liquid sensing port with an outer surface of the liquid ring adjacent the interior circumference of the separator chamber; a liquid/gas mixture sensing chamber defined between a top surface of the sensing piston and a sensing chamber wall of the main housing in fluid communication through a mixture sensing port with an inner surface of the liquid ring opposed to the outer surface of the liquid ring; a valve stem mount collar defined within the sensing chamber wall that adjustably receives and secures the valve stem; and a stem control spring positioned around the valve stem mount collar and between the sensing chamber wall and the sensing piston that adjustably biases the control tip of the valve stem to variably discharge liquid into the second liquid discharge line as the sensing piston moves in response to changing pressure differentials between a first inner pressure adjacent the inner surface of the liquid ring and a second outer pressure adjacent the outer surface of the liquid ring; and f. a sensing differential maintenance means for maintaining a pressure differential between a pressure of liquid in the rotating liquid ring and a pressure of liquid in a sensing chamber of the level control means.

15. The improved liquid/gas separator of claim 14, wherein the level control valve further comprises a purge gap defined between the sensing piston and the sensing chamber wall of the main housing to permit a small flow of liquid from the liquid sensing chamber into the mixture sensing chamber.

16. The improved liquid/gas separator of claim 15, wherein the level control valve further comprises an isolating means for isolating the liquid sensing chamber from pressure adjacent the liquid discharge throughbore.

17. The improved liquid/gas separator of claim 16, further comprising a check valve secured in fluid communication with the exhaust duct of the hub portion of the main shaft to adjustably prohibit flow of liquid or gas out of the separator chamber through the exhaust duct.

18. The improved liquid/gas separator of claim 17, further comprising a liquid discharge pump secured to the main shaft and in fluid communication with the level control valve to pump liquid out of the liquid/gas separator.

19. The improved liquid/gas separator of claim 18, further comprising a fan secured in fluid communication with the exhaust duct to draw gas through the pre-swirl chamber, separator chamber and exhaust duct.

20. The improved liquid/gas separator of claim 19, further comprising at least one liquid sensor in fluid communication with the exhaust duct and in electrical communication with the fan to shut down the fan upon sensing of liquid passing from the separator chamber through the exhaust duct.

* * * * *